US012807139B2

(12) United States Patent
Kwon et al.

(10) Patent No.: US 12,807,139 B2
(45) Date of Patent: Nov. 24, 2026

(54) AUTONOMOUS VEHICLE AND METHOD OF CONTROLLING

(71) Applicants: Hyundai Motor Company, Seoul (KR); Kia Corporation, Seoul (KR)

(72) Inventors: Yong Seok Kwon, Hwaseong-Si (KR); Tae Geun An, Hwaseong-Si (KR); Dae Seok Jeon, Hwaseong-Si (KR); Sang Min Lee, Hwaseong-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 24 days.

(21) Appl. No.: 18/965,876

(22) Filed: Dec. 2, 2024

(65) Prior Publication Data

US 2025/0296556 A1 Sep. 25, 2025

(30) Foreign Application Priority Data

Mar. 22, 2024 (KR) ........................ 10-2024-0039787

(51) Int. Cl.

*B60W 30/09* (2012.01)
*B60W 30/095* (2012.01)
(Continued)

(52) U.S. Cl.

CPC ........ *B60W 30/09* (2013.01); *B60W 30/0956* (2013.01); *B60W 30/182* (2013.01);
(Continued)

(58) Field of Classification Search

CPC .. B60W 30/09; B60W 30/0956; B60W 30/14; B60W 30/18163; B60W 30/182; B60W 50/0097; B60W 60/0015; B60W 2050/0083; B60W 2554/4041; B60W 2554/4044; B60W 2554/4045; B60W 2554/802; G05D 1/242; G05D 1/243; G05D 1/43; G05D 1/633
(Continued)

(56) References Cited

U.S. PATENT DOCUMENTS 11,747,806 B1 * 9/2023 Wootton ............... B60W 10/04 701/28
12,570,277 B2 * 3/2026 Lee ....................... B60W 30/09
(Continued)

FOREIGN PATENT DOCUMENTS

CN 117246321 A * 12/2023 ........ B60W 30/0956
CN 119026003 A * 11/2024 ............. G06N 3/006
(Continued)

*Primary Examiner* — Atul Trivedi
(74) *Attorney, Agent, or Firm* — Banner & Witcoff, Ltd.

(57) ABSTRACT

An autonomous vehicle may include one or more sensors configured to detect at least one vehicle, memory, and a processor. The processor may be configured to set a lead vehicle, of the at least one vehicle, as a target vehicle. The lead vehicle may be traveling ahead of the vehicle. The processor may be further configured to: receive, via the one or more sensors, driving information associated with the target vehicle; determine, based on the driving information and a predetermined cut-out condition, a likelihood of the target vehicle cutting out of a lane; and control, based on the determined likelihood, the vehicle to operate in a safety control mode of a plurality of safety control modes.

19 Claims, 10 Drawing Sheets

(51) Int. Cl.
*B60W 30/182* (2020.01)
*B60W 50/00* (2006.01)
*B60W 60/00* (2020.01)

(52) U.S. Cl.
CPC .... *B60W 50/0097* (2013.01); *B60W 60/0015* (2020.02); *B60W 2050/0083* (2013.01); *B60W 2554/4041* (2020.02); *B60W 2554/4044* (2020.02); *B60W 2554/4045* (2020.02); *B60W 2554/802* (2020.02)

(58) Field of Classification Search
USPC .......................................................... 701/301
See application file for complete search history.

(56) References Cited

U.S. PATENT DOCUMENTS

| | | | | |
|---|---|---|---|---|
| 2011/0082623 | A1* | 4/2011 | Lu | B60W 10/06 701/41 |
| 2015/0251656 | A1* | 9/2015 | Yester | B60W 30/09 701/41 |
| 2018/0257647 | A1* | 9/2018 | Jurca | B60W 30/0956 |
| 2020/0317199 | A1* | 10/2020 | Berghöfer | B60W 40/04 |
| 2021/0309254 | A1* | 10/2021 | Murahashi | B60W 60/0015 |
| 2021/0394752 | A1* | 12/2021 | Satoh | B60W 30/09 |
| 2022/0194411 | A1* | 6/2022 | Lee | B60K 35/10 |
| 2022/0244736 | A1* | 8/2022 | Konrardy | B60W 30/09 |
| 2022/0315052 | A1* | 10/2022 | Oboril | B60W 60/00274 |
| 2022/0348227 | A1* | 11/2022 | Foster | B60Q 1/507 |
| 2022/0355802 | A1* | 11/2022 | Chaves | B60W 40/09 |
| 2022/0365530 | A1* | 11/2022 | Foster | B60W 50/029 |
| 2023/0098344 | A1* | 3/2023 | Voigt | B60W 30/09 701/41 |
| 2023/0192079 | A1* | 6/2023 | Shimizu | B60W 30/0953 701/301 |
| 2023/0202530 | A1* | 6/2023 | Abad | B60W 60/0027 701/26 |
| 2023/0219565 | A1* | 7/2023 | An | B60W 30/09 701/301 |
| 2023/0234572 | A1* | 7/2023 | Iwase | B60W 30/0956 |
| 2023/0234573 | A1* | 7/2023 | Iwase | B60W 30/09 701/26 |
| 2023/0234574 | A1* | 7/2023 | Funabashi | B60W 30/0956 701/301 |
| 2023/0234575 | A1* | 7/2023 | Iwase | B60W 30/09 |
| 2023/0234579 | A1* | 7/2023 | Ugajin | B60W 30/0956 |
| 2023/0356775 | A1* | 11/2023 | Kuehner | B62D 5/001 |
| 2024/0109541 | A1* | 4/2024 | Ucar | G08G 1/0112 |
| 2024/0270238 | A1* | 8/2024 | Min | B60W 30/0956 |
| 2024/0400101 | A1* | 12/2024 | Topan | B60W 60/0015 |
| 2024/0409090 | A1* | 12/2024 | Abroshan | B60W 60/0011 |
| 2026/0021809 | A1* | 1/2026 | Searock | B60W 30/09 |
| 2026/0138627 | A1* | 5/2026 | Osherov | B60W 50/085 |

FOREIGN PATENT DOCUMENTS

| | | | | |
|---|---|---|---|---|
| KR | 10-2018-0065585 A | 6/2018 | | |
| KR | 10-2018-0066524 A | 6/2018 | | |
| WO | WO-2022243166 A1 * | 11/2022 | | B60W 50/0205 |
| WO | WO-2024022141 A1 * | 2/2024 | | B60W 50/0097 |

* cited by examiner

| Index | Detailed condition | Determination result | Final determination |
|---|---|---|---|
| A | $Cnt > C_{th}$ | 1 | 1 |
| B1 | $Abs(v_{y.target}) > v_{yth}$ | 1 | |
| B2 | $Abs(a_{y.target}) > a_{yth}$ | 1 | |
| C1 | + | 1 | |
| C2 | + | 1 | |
| D | $TTIT_{2nd} < T_{th}$ | 1 | |

| Index | Detailed condition | Determination result | Final determination |
|---|---|---|---|
| A | $Cnt < C_{th}$ | 0 | 0 |
| B1 | $Abs(v_{y,target}) > v_{yth}$ | 1 | |
| B2 | $Abs(a_{y,target}) > a_{yth}$ | 1 | |
| C1 | + | 1 | |
| C2 | + | 1 | |
| D | $TTIT_{2nd} < T_{th}$ | 1 | |

AUTONOMOUS VEHICLE AND METHOD OF CONTROLLING

CROSS-REFERENCE TO RELATED APPLICATION

This application claims the benefit of Korean Patent Application No. 10-2024-0039787, filed on Mar. 22, 2024, which is incorporated herein by reference for all purposes.

BACKGROUND

Technical Field

The present disclosure relates to an autonomous vehicle and a control method thereof.

Description

A vehicle may be a device capable of transporting people or goods to a destination while traveling on a road or track. The vehicle may move from one location to another by means of one or more wheels mounted on its body. The vehicle may include three- or four-wheeled vehicles, two-wheeled vehicles such as motorcycles, and construction machinery, bicycles, trains traveling on rails arranged on tracks, and the like.

In modern society, vehicles (e.g., ground vehicles) are some of the most common means of transportation, and the number of people using the vehicles is increasing. While advances in vehicle technology have made it easier to travel long distances and improved the quality of human lives, they have also led to deteriorating road traffic conditions in densely populated areas such as Korea, which often leads to severe traffic congestion.

SUMMARY

An object of the present disclosure is to provide an autonomous vehicle and a control method thereof that may determine the behavior of a preceding vehicle traveling before the autonomous vehicle using sensors such as a front camera, a front radar, and a front-side lidar, and vary a brake control time based on a result of the determination.

The technical objects to be achieved by the present disclosure are not limited to those described above, and other technical objects not described above may also be clearly understood by those skilled in the art from the following description.

According to one or more example embodiments of the present disclosure, a vehicle may include: one or more sensors configured to detect at least one vehicle; memory configured to store computer-readable instructions; and a processor configured to execute the computer-readable instructions. The processor, by executing the computer-readable instructions, may be configured to: set a lead vehicle, of the at least one vehicle, as a target vehicle; receive, via the one or more sensors, driving information associated with the target vehicle; determine, based on the driving information and a predetermined cut-out condition, a likelihood of the target vehicle cutting out of a lane; and control, based on the determined likelihood, the vehicle to operate in a safety control mode of a plurality of safety control modes. The lead vehicle may be traveling ahead of the vehicle.

The driving information may indicate at least one of: a lateral position of the target vehicle, a lateral velocity of the target vehicle, a lateral direction of the target vehicle, a path of the target vehicle, or a path of the vehicle.

The processor may be further configured to: determine, based on the lateral position of the target vehicle, a first movement index; determine, based on the lateral velocity of the target vehicle, a second movement index; determine, based on the lateral direction of the target vehicle, a motion index; and determine, based on the path of the target vehicle and the path of the vehicle, a collision index.

The plurality of safety control modes may include a first safety control mode and a second safety control mode. The second safety control mode may require a faster reaction of the vehicle than the first safety control mode. The processor may be configured to control the vehicle to operate in the safety control mode by: based on the first movement index, the second movement index, the motion index, and the collision index satisfying the predetermined cut-out condition, controlling the vehicle in the second safety control mode.

The plurality of safety control modes may include a first safety control mode and a second safety control mode. The second safety control mode may require a faster reaction of the vehicle than the first safety control mode. The processor may be configured to control the vehicle to operate in the safety control mode by: based on at least one of the first movement index, the second movement index, the motion index, or the collision index not satisfying the predetermined cut-out condition, controlling the vehicle in the first safety control mode.

A brake control time associated with the second safety control mode may be different from a brake control time associated with the first safety control mode.

A brake control time associated with the second safety control mode may be less than a brake control time associated with the first safety control mode.

A brake control time associated with the second safety control mode may include: a collision warning time, a first emergency braking time, and a second emergency braking time. The processor may be further configured to: change the collision warning time, the first emergency braking time, and the second emergency braking time, based on a distance between the target vehicle and a control target sensed after the target vehicle cuts out of the lane.

The processor may be further configured to: set, based on the lead vehicle and the vehicle traveling in the lane, the lead vehicle as the target vehicle.

According to one or more example embodiments of the present disclosure, a method performed by an apparatus of a vehicle may include: detecting, via one or more sensors of the vehicle, at least one vehicle; setting a lead vehicle, of the at least one vehicle, as a target vehicle; receiving, via the one or more sensors, driving information associated with the target vehicle; determining, based on the driving information and a predetermined cut-out condition, a likelihood of the target vehicle cutting out of a lane; and controlling, based on the determined likelihood, the vehicle to operate in a safety control mode of a plurality of safety control modes. The lead vehicle may be traveling ahead of the vehicle.

The driving information may indicate at least one of: a lateral position of the target vehicle, a lateral velocity of the target vehicle, a lateral direction of the target vehicle, a path of the target vehicle, or a path of the vehicle.

The method may further include: determining, based on the lateral position of the target vehicle, a first movement index; determining, based on the lateral velocity of the target vehicle, a second movement index; determining, based on the lateral direction of the target vehicle, a motion index; and determining, based on the path of the target vehicle and the path of the vehicle, a collision index.

The plurality of safety control modes may include a first safety control mode and a second safety control mode. The second safety control mode may require a faster reaction of the vehicle than the first safety control mode. Controlling the vehicle to operate in the safety control mode may include: based on the first movement index, the second movement index, the motion index, and the collision index satisfying the predetermined cut-out condition, controlling the vehicle in the second safety control mode.

The plurality of safety control modes may include a first safety control mode and a second safety control mode. The second safety control mode may require a faster reaction of the vehicle than the first safety control mode. Controlling the vehicle to operate in the safety control mode may include: based on at least one of the first movement index, the second movement index, the motion index, or the collision index not satisfying the predetermined cut-out condition, controlling the vehicle in the first safety control mode.

A brake control time associated with the second safety control mode may be different from a brake control time associated with the first safety control mode.

A brake control time associated with the second safety control mode may be less than a brake control time associated with the first safety control mode.

A brake control time associated with the second safety control mode may include: a collision warning time, a first emergency braking time, and a second emergency braking time. The method may further include: changing the collision warning time, the first emergency braking time, and the second emergency braking time, based on a distance between the target vehicle and a control target sensed after the target vehicle cuts out of the lane.

The method may further include: setting, based on the lead vehicle and the vehicle traveling in the lane, the lead vehicle as the target vehicle.

The effects that can be achieved from the present disclosure are not limited to those described above, and other effects not described above may also be clearly understood by those skilled in the art from the following description.

DETAILED DESCRIPTION

Figure 1:
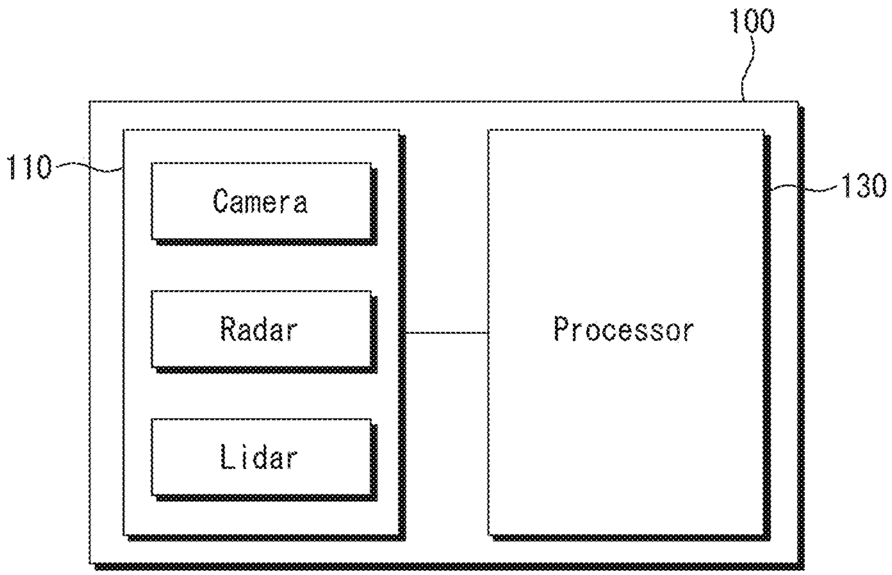
FIG. 1 is a block diagram illustrating an autonomous vehicle.

Hereinafter, one or more example embodiments of the present disclosure will be described in detail with reference to the accompanying drawings, and the same or similar elements will be given the same reference numerals regardless of reference symbols, and a repeated description thereof will be omitted. Further, in the following description of the example embodiments, if it is determined that a detailed description of related publicly known technology obscures the gist of the example embodiments described herein, the detailed description thereof will be omitted.

As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof. In addition, when describing the one or more example embodiments with reference to the accompanying drawings, like reference numerals refer to like components and a repeated description related thereto will be omitted.

For purposes of this application and the claims, using the exemplary phrase "at least one of: A; B; or C" or "at least one of A, B, or C," the phrase means "at least one A, or at least one B, or at least one C, or any combination of at least one A, at least one B, and at least one C. Further, exemplary phrases, such as "A, B, and C", "A, B, or C", "at least one of A, B, and C", "at least one of A, B, or C", etc. as used herein may mean each listed item or all possible combinations of the listed items. For example, "at least one of A or B" may refer to (1) at least one A; (2) at least one B; or (3) at least one A and at least one B.

In recent years, there has been active research on vehicles equipped with an advanced driver-assistance system (ADAS) that actively provides information about vehicle status, driver status, and the surroundings to reduce the burden on the driver and improve convenience.

The ADAS provided in vehicles may include, for example, forward collision-avoidance assist (FCA) and autonomous emergency braking (AEB) systems. These systems may determine the risk of a collision with another vehicle or an intersecting vehicle in a driving situation of a vehicle and apply emergency braking in the event of a high chance of a collision to avoid the collision.

However, some implementations of the FCA system may have difficulties in recognizing a state (e.g., an event) associated with any vehicles beyond the vehicle that is immediately ahead of an (ego) vehicle in a field of view (FOV) of the vehicle, and may fail to accurately determine a brake control time due to such an inaccurately recognized situation. Therefore, a collision with the leading vehicle may not be effectively assessed and prevented.

An automation level of an autonomous driving vehicle may be classified as follows, according to the American Society of Automotive Engineers (SAE). At autonomous driving level 0, the SAE classification standard may correspond to "no automation," in which an autonomous driving system is temporarily involved in emergency situations (e.g., automatic emergency braking) and/or provides warnings only (e.g., blind spot warning, lane departure warning, etc.), and a driver is expected to operate the vehicle. At autonomous driving level 1, the SAE classification standard may correspond to "driver assistance," in which the system performs some driving functions (e.g., steering, acceleration, brake, lane centering, adaptive cruise control, etc.) while the driver operates the vehicle in a normal operation section, and the driver is expected to determine an operation state and/or timing of the system, perform other driving functions, and cope with (e.g., resolve) emergency situations. At autonomous driving level 2, the SAE classification standard may correspond to "partial automation," in which the system performs steering, acceleration, and/or braking under the supervision of the driver, and the driver is expected to determine an operation state and/or timing of the system, perform other driving functions, and cope with (e.g., resolve) emergency situations. At autonomous driving level 3, the SAE classification standard may correspond to "conditional automation," in which the system drives the vehicle (e.g., performs driving functions such as steering, acceleration, and/or braking) under limited conditions but transfer driving control to the driver when the required conditions are not met, and the driver is expected to determine an operation state and/or timing of the system, and take over control in emergency situations but do not otherwise operate the vehicle (e.g., steer, accelerate, and/or brake). At autonomous driving level 4, the SAE classification standard may correspond to "high automation," in which the system performs all driving functions, and the driver is expected to take control of the vehicle only in emergency situations. At autonomous driving level 5, the SAE classification standard may correspond to "full automation," in which the system performs full driving functions without any aid from the driver including in emergency situations, and the driver is not expected to perform any driving functions other than determining the operating state of the system. Although the present disclosure may apply the SAE classification standard for autonomous driving classification, other classification methods and/or algorithms may be used in one or more configurations described herein. One or more features associated with autonomous driving control may be activated based on configured autonomous driving control setting(s) (e.g., based on at least one of: an autonomous driving classification, a selection of an autonomous driving level for a vehicle, etc.).

Based on one or more features (e.g., controlling a vehicle in a safety control mode based on behaviors of a lead vehicle) described herein, an operation of the vehicle may be controlled. The vehicle control may include various operational controls associated with the vehicle (e.g., autonomous driving control, sensor control, braking control, braking time control, acceleration control, acceleration change rate control, alarm timing control, forward collision warning time control, etc.).

One or more auxiliary devices (e.g., engine brake, exhaust brake, hydraulic retarder, retarder, electric regenerative brake, etc.) may also be controlled, for example, based on one or more features (e.g., controlling a vehicle in a safety control mode based on behaviors of a lead vehicle) described herein. One or more communication devices (e.g., a modem, a network adapter, a radio transceiver, an antenna, etc., that is capable of communicating via one or more wired or wireless communication protocols, such as Ethernet, Wi-Fi, near-field communication (NFC), Bluetooth, Long-Term Evolution (LTE), 5G New Radio (NR), vehicle-to-everything (V2X), etc.) may also be controlled, for example, based on one or more features (e.g., controlling a vehicle in a safety control mode based on behaviors of a lead vehicle) described herein.

Minimum risk maneuver (MRM) operation(s) may also be controlled, for example, based on one or more features (e.g., controlling a vehicle in a safety control mode based on behaviors of a lead vehicle) described herein. A minimal risk maneuvering operation (e.g., a minimal risk maneuver, a minimum risk maneuver) may be a maneuvering operation of a vehicle to minimize (e.g., reduce) a risk of collision with surrounding vehicles in order to reach a lowered (e.g., minimum) risk state. A minimal risk maneuver may be an operation that may be activated during autonomous driving of the vehicle when a driver is unable to respond to a request to intervene. During the minimal risk maneuver, one or more processors of the vehicle may control a driving operation of the vehicle for a set period of time.

Biased driving operation(s) may also be controlled, for example, based on one or more features (e.g., controlling a vehicle in a safety control mode based on behaviors of a lead vehicle) described herein. A driving control apparatus may perform a biased driving control. To perform a biased driving, the driving control apparatus may control the vehicle to drive in a lane by maintaining a lateral distance between the position of the center of the vehicle and the center of the lane. For example, the driving control apparatus may control the vehicle to stay in the lane but not in the center of the lane.

The driving control apparatus may identify a biased target lateral distance for biased driving control. For example, a biased target lateral distance may include an intentionally adjusted lateral distance that a vehicle may aim to maintain from a reference point, such as the center of a lane or another vehicle, during maneuvers such as lane changes. This adjustment may be made to improve the vehicle's stability, safety, and/or performance under varying driving conditions, etc. For example, during a lane change, the driving control system may bias the lateral distance to keep a safer gap from adjacent vehicles, considering factors such as the vehicle's speed, road conditions, and/or the presence of obstacles, etc.

One or more sensors (e.g., IMU sensors, camera, LIDAR, RADAR, blind spot monitoring sensor, line departure warning sensor, parking sensor, light sensor, rain sensor, traction control sensor, anti-lock braking system sensor, tire pressure monitoring sensor, seatbelt sensor, airbag sensor, fuel sensor, emission sensor, throttle position sensor, inverter, converter, motor controller, power distribution unit, high-voltage wiring and connectors, auxiliary power modules, charging interface, etc.) may also be controlled, for example, based on one or more features (e.g., controlling a vehicle in a safety control mode based on behaviors of a lead vehicle) described herein.

An operation control for autonomous driving of the vehicle may include various driving control of the vehicle by the vehicle control device (e.g., acceleration, deceleration, steering control, gear shifting control, braking system control, traction control, stability control, cruise control, lane keeping assist control, collision avoidance system control, emergency brake assistance control, traffic sign recognition control, adaptive headlight control, etc.).

FIG. 1 is a block diagram illustrating an autonomous vehicle.

Referring to FIG. 1, an autonomous vehicle 100 may include at least one sensor 110 and a processor 130.

The sensor 110 may be mounted as one or more sensors on the autonomous vehicle 100. The sensor 110 may be mounted on the autonomous vehicle 100 to obtain various sensor information about the surroundings of the autonomous vehicle 100 while the autonomous vehicle 100 is traveling, and provide the sensor information to the processor 130, which will be described below. The autonomous vehicle 100 may also be referred to herein as an ego vehicle for ease of explanation. The vehicle that an autonomous driving system is actively controlling may be referred to as an ego vehicle, a host vehicle, or an autonomous vehicle. The ego vehicle (e.g., the host vehicle, the autonomous vehicle, etc.) may be the vehicle that is equipped with the autonomous driving system. A car that is ahead of the ego vehicle (e.g., in the same driving lane as the ego vehicle) may be referred to as a car in front, a lead vehicle, a leading vehicle, or a preceding vehicle. A car that follows the ego vehicle (e.g., in the same driving lane as the ego vehicle) may be referred to as a car behind, a trailing vehicle, or a succeeding vehicle. A target vehicle may be any vehicle that is near the ego vehicle (e.g., within a threshold distance away from the ego vehicle) that the autonomous driving system is monitoring and/or analyzing. The target vehicle may include, for example, one or more lead vehicles and/or trailing vehicles.

The sensor information may include various information about other vehicles traveling in the vicinity of the autonomous vehicle 100 that is currently traveling. The sensor information may include, for example, a distance between the ego vehicle 100 and another vehicle, a relative speed of the other vehicle, a driving lane position of the other vehicle, information about obstacles and traffic lights, and the like.

The sensor 110 may include, for example, a camera, radar, a lidar, and a global positioning system (GPS). The sensor 110 may obtain at least one of the following: an image of the surroundings of the ego vehicle 100, a distance between the ego vehicle 100 and another vehicle, a relative speed of the other vehicle, a position of the other vehicle, obstacles and traffic lights, and the like, through the camera, the radar, and the lidar, and may obtain a current position of the ego vehicle 100 through the GPS. However, examples are not limited thereto.

The processor 130 may receive at least one sensor information from the sensor 110 which is mounted as a plurality of sensors on the ego vehicle 100, and may sense other vehicles traveling in the vicinity of the ego vehicle 100 based on the sensor information.

For example, in a case where a sensed vehicle is traveling before the ego vehicle 100 but traveling on the same lane as the ego vehicle 100, the processor 130 may set the sensed other vehicle as a target vehicle.

Once the target vehicle is set, the processor 130 may collect driving information of the target vehicle using the sensor 110. The driving information may include lateral position information of the target vehicle, lateral velocity information of the target vehicle, lateral direction information of the target vehicle, and information about a path of the target vehicle and a path of the ego vehicle 100.

The processor 130 may compare and analyze the collected driving information and a preset (e.g., predetermined) cut-out condition, and may determine whether the cut-out condition is satisfies based on a result of the comparison and analysis.

The processor 130 may control the ego vehicle 100 to operate in a first safety control mode or a second safety control mode based on a result of the determination. This will be described in more detail below.

Figure 2:
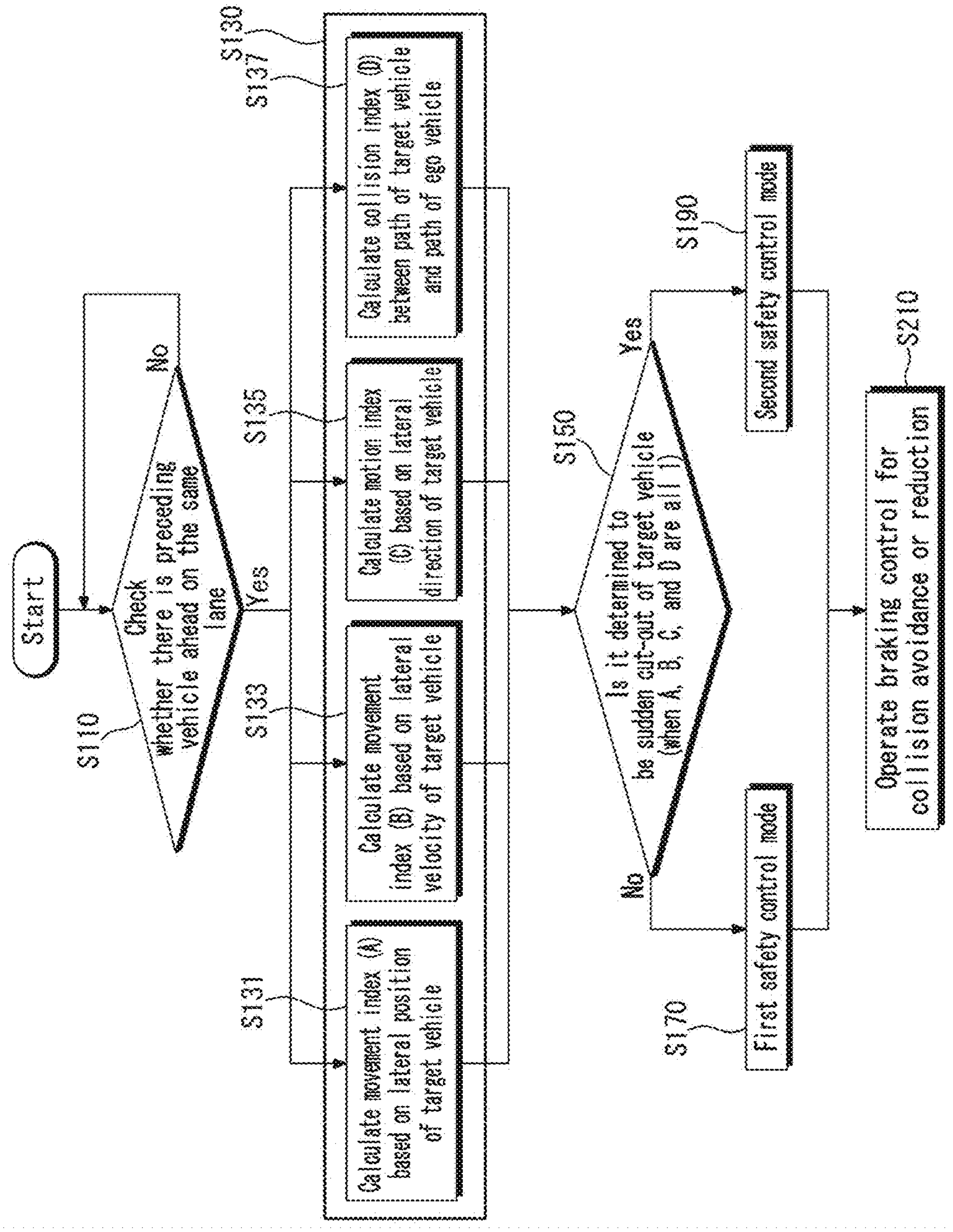
FIG. 2 is a flowchart illustrating a method of controlling an autonomous vehicle.

FIG. 2 is a flowchart illustrating a method of controlling an autonomous vehicle.

Referring to FIG. 2, an example method of controlling driving of the autonomous vehicle 100 is as follows.

In step S110, the autonomous vehicle 100 may determine whether there is a preceding vehicle (e.g., a lead vehicle) on the same lane as the autonomous vehicle 100 while traveling, under the control of the processor 130. The lead vehicle may be ahead of (e.g., directly ahead of) the autonomous vehicle 100. For example, under the control of the processor 130, the autonomous vehicle 100 may receive at least one sensor information from the sensor 110 which is provided as a plurality of sensors in the autonomous vehicle 100 and may sense another vehicle traveling before the autonomous vehicle 100 based on the sensor information.

For example, in a case where the sensed other vehicle is traveling before the ego vehicle 100 but traveling on the same lane as the ego vehicle 100, the autonomous vehicle 100 may set the sensed other vehicle as a target vehicle, under the control of the processor 130.

In step S130, the autonomous vehicle 100 may collect driving information of the set target vehicle, and may compare and determine the collected driving information to a set cut-out condition, under the control of the processor 130.

The driving information may include lateral position information of the target vehicle, lateral velocity information of the target vehicle, lateral direction information of the target vehicle, and information about a path of the target vehicle and a path of the ego vehicle 100.

The autonomous vehicle 100 may compare and analyze the collected driving information and a preset cut-out condition, and determine whether the cut-out condition is satisfied based on a result of the comparison and analysis, under the control of the processor 130.

For example, under the control of the processor 130, the autonomous vehicle 100 may calculate, from the collected driving information, a first movement index (Movement Index 1) based on the lateral position information of the target vehicle, a second movement index (Movement Index 2) based on the lateral velocity information of the target vehicle, a motion index based on the lateral direction information of the target vehicle, and a collision index based on the path of the target vehicle and the path of the ego vehicle 100 in step S131, S133, S135, and S137, respectively. This will be described in more detail below.

In step S150, the autonomous vehicle 100 may compare and analyze each of the calculated first movement index, the calculated second movement index, the calculated motion index, and the calculated collision index, with respect to the preset cut-out condition, under the control of the processor 130.

In this case, if any of the calculated first movement index, the calculated second movement index, the calculated motion index, and the calculated collision index does not satisfy the preset cut-out condition, the autonomous vehicle 100 may determine that the cut-out condition is not satisfied (No in step S150), under the control of the processor 130.

In step S170, if it is determined that the cut-out condition is not satisfied, the autonomous vehicle 100 may predict that the target vehicle is highly unlikely to make a sudden or sharp cut-out and that the front situation of the target vehicle is safe, and may operate in a first safety control mode based on a result of the prediction, under the control of the processor 130. The first safety control mode may be a safety control mode that operates based on a preset brake control time.

In contrast, if all of the calculated first movement index, the calculated second movement index, the calculated motion index, and the calculated collision index satisfy the preset cut-out condition, the autonomous vehicle 100 may determine that the cut-out condition is satisfied (Yes in step S150), under the control of the processor 130.

In step S190, if it is determined that the cut-out condition is satisfied, the autonomous vehicle 100 may predict that the target vehicle is highly likely to make a sudden or sharp cut-out and that the target vehicle is unsafe due to an unexpected event or dangerous situation in front of the target vehicle, and may operate in a second safety control mode based on a result of the prediction, under the control of the processor 130. The second safety control mode may be a safety control mode that operates by changing the preset brake control time to another brake control time. The second safety control mode may be a brake control time that is ahead of the first safety control mode (e.g., a brake control time associated with the second safety control mode may be shorter than a brake control time associated with the first safety control mode). The second safety control mode may require a faster reaction (e.g., braking) time of the vehicle than the first safety control mode.

As described above, the autonomous vehicle 100 may calculate a behavior of the target vehicle with respect to the cut-out and may change the brake control time, under the control of the processor 130.

In step S210, the autonomous vehicle 100 may provide braking control to avoid or relieve a collision with the target vehicle or a sudden event occurring in front of the target vehicle, under the control of the processor 130.

Figure 3:
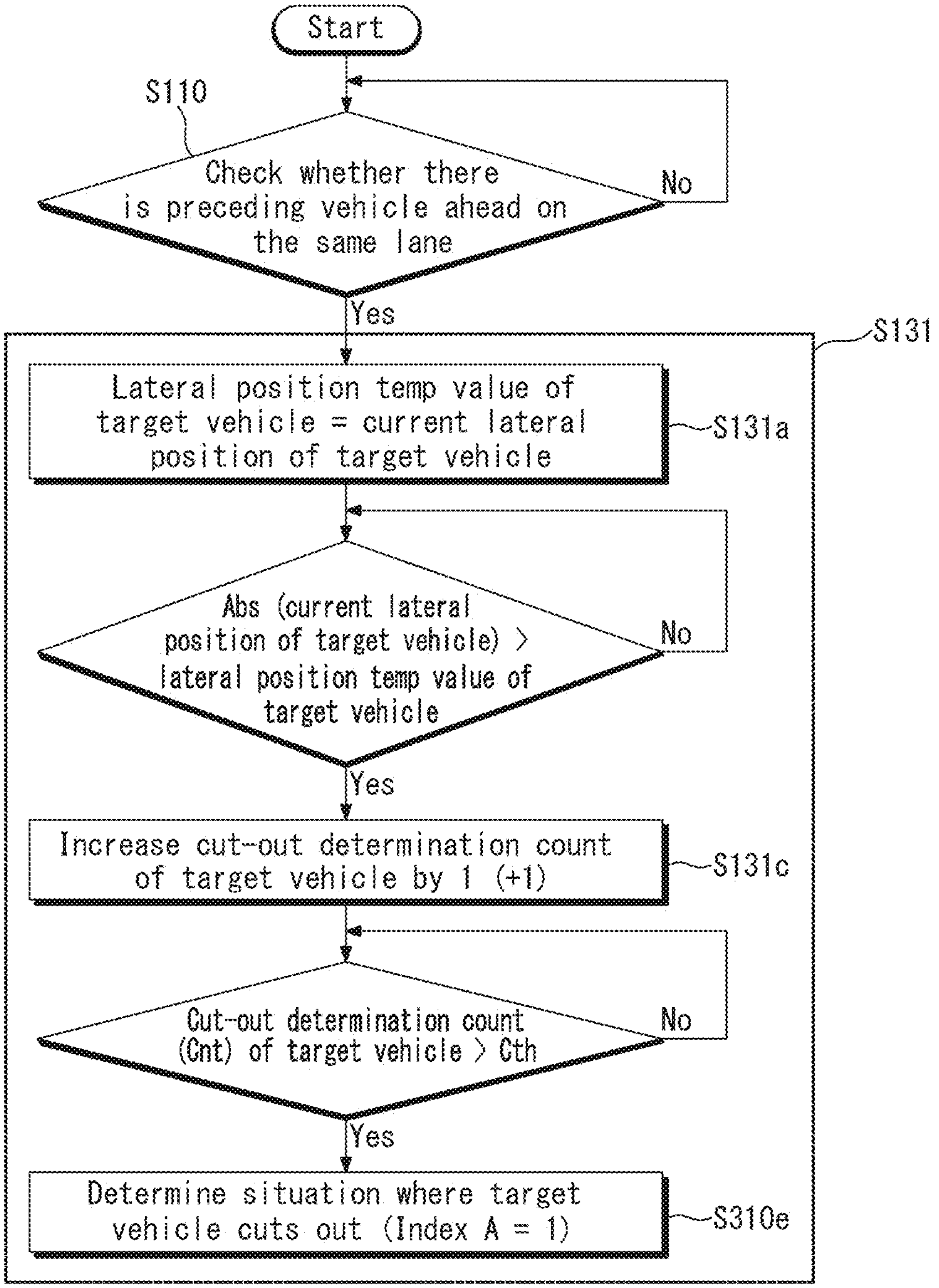
FIG. 3 is a flowchart illustrating a method of calculating a first movement index (Movement Index 1) based on lateral position information of a target vehicle.

FIG. 3 is a flowchart illustrating a method of calculating a first movement index (Movement Index 1) based on lateral position information of a target vehicle.

Referring to FIG. 3, an example method of calculating a first movement index is as follows.

In step S110, the autonomous vehicle 100 may determine whether there is a preceding vehicle on the same lane before the ego vehicle 100, under the control of the processor 130. This will not be described in detail here as already been described above.

In step S131, the autonomous vehicle 100 may collect driving information of a set target vehicle, and may compare and determine the collected driving information to a preset cut-out condition, under the control of the processor 130. The driving information may include lateral position information of the target vehicle.

In step S131*a*, the autonomous driving vehicle 100 may set a lateral position temp value of the target vehicle to a current lateral position of the target vehicle, under the control of the processor 130. In this case, the current lateral position of the target vehicle may be set based on an absolute value as a reference (absolute value reference).

In step S131*b*, the autonomous vehicle 100 may track, in real time, the lateral position temp value of the target vehicle that changes, using the collected driving information, and may compare and analyze the changing lateral position temp value of the target vehicle to a current lateral position of the target vehicle that is the set absolute value reference, under the control of the processor 130.

If the current lateral position of the target vehicle, which is the absolute value reference, is greater than the lateral position temp value of the target vehicle, the autonomous vehicle 100 may determine that the target vehicle is moving in a left/right direction from the center of the ego vehicle 100, under the control of the processor 130.

In step S131*c*, each time the current lateral position of the target vehicle, which is the absolute value reference, becomes greater than the lateral position temp value of the target vehicle, the autonomous driving vehicle 100 may count a cut-out determination count (Cnt) of the target vehicle by one (+1), under the control of the processor 130.

If the cut-out determination count of the target vehicle becomes greater than a preset threshold determination value (Cth), the autonomous driving vehicle 100 may determine a cut-out situation where the target vehicle cuts out from the current lane to a neighboring lane, under the control of the processor 130.

In step S131*d*, if the cut-out determination count of the target vehicle is greater than the preset threshold determination value Cth, the autonomous vehicle 100 may determine that the preset cut-out condition is satisfied, under the control of the processor 130.

In step S131*e*, if the cut-out situation is determined, the autonomous driving vehicle 100 may set a first movement index (Movement Index 1) to "1 (Index A=1)," under the control of the processor 130.

That is, if the current lateral position of the target vehicle, which is the absolute value reference, increases to be greater than the lateral position temp value of the target vehicle compared to a previous value, the autonomous driving vehicle 100 may predict that the target vehicle is moving in the left/right direction from the center of the ego vehicle 100, under the control of the processor 130.

Accordingly, under the control of the processor 130, the autonomous vehicle 100 may continue to monitor such a tendency and, if the target vehicle is continuously moving in the left/right direction relative to the center of the ego vehicle 100 at a level above a certain level relative to an initially selected point of the target vehicle, may determine that the target vehicle is cutting out.

As described above, the autonomous vehicle 100 may calculate the first movement index based on the lateral position of the target vehicle, and track a change in a relative lateral position of the target vehicle based on the calculated first movement index, under the control of the processor 130.

Also, if the target vehicle that is being tracked continues to move in a direction receding from the center of the ego vehicle 100, the autonomous vehicle 100 may then determine a cut-out, under the control of the processor 130.

Figure 4:
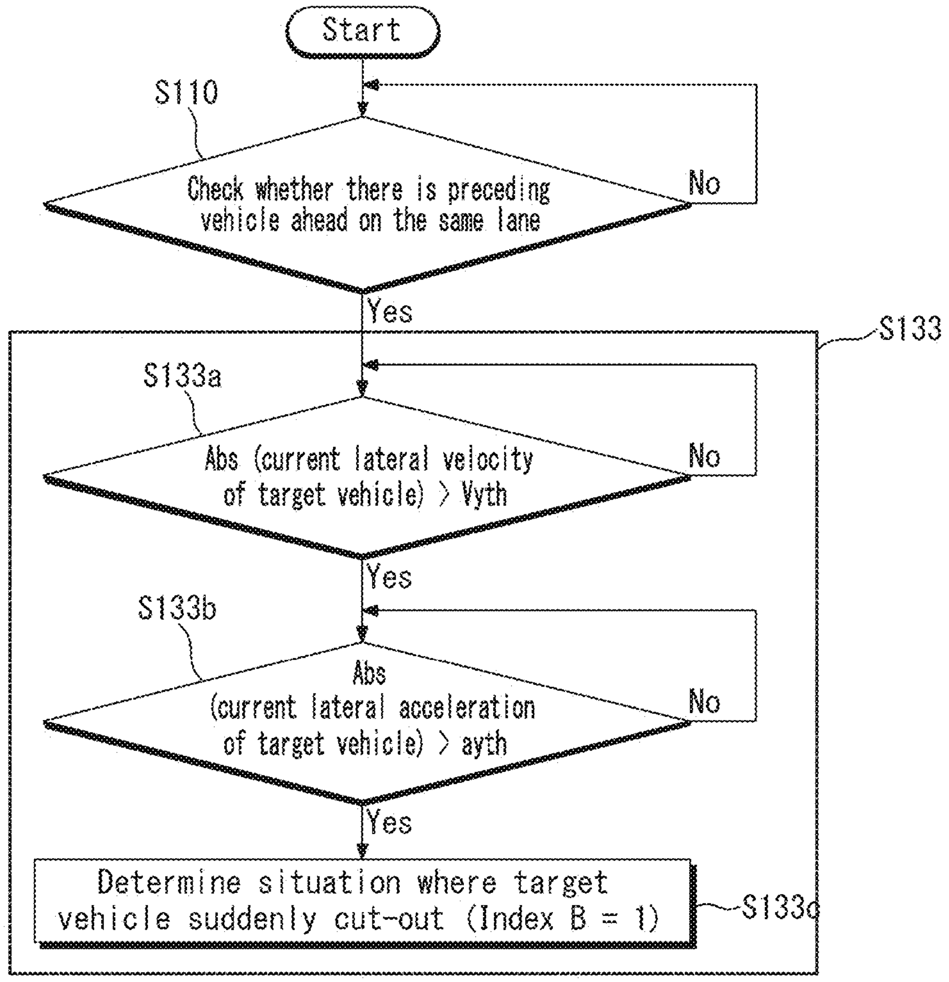
FIG. 4 is a flowchart illustrating a method of calculating a second movement index (Movement Index 2) based on lateral velocity information of a target vehicle.

FIG. 4 is a flowchart illustrating a method of calculating a second movement index (Movement Index 2) based on lateral velocity information of a target vehicle.

Referring to FIG. 4, an example method of calculating a second movement index is as follows.

In step S110, the autonomous vehicle 100 may determine whether there is a preceding vehicle on the same lane before the ego vehicle 100, under the control of the processor 130. This will not be described in detail here as already been described above.

the autonomous vehicle 100 may collect driving information of a set target vehicle, and may compare and determine the collected driving information to a preset cut-out condition, under the control of the processor 130. The driving information may include lateral velocity information of the target vehicle. The lateral velocity information of the target vehicle may include a lateral velocity of the target vehicle and a lateral acceleration of the target vehicle.

In step S133, the autonomous vehicle 100 may analyze the lateral velocity information of the target vehicle by collecting the driving information of the set target vehicle, under the control of the processor 130.

In step S133*a*, if a current lateral velocity of the target vehicle is higher than a preset threshold lateral velocity (vyth) based on a result of the analysis, the autonomous vehicle 100 may predict that the target vehicle cuts out suddenly or sharply, under the control of the processor 130.

In step S133*b*, if a current lateral acceleration of the target vehicle is higher than a preset threshold lateral acceleration (ayth, B2) while the current lateral velocity of the target vehicle is higher than the preset threshold lateral velocity (vyth, B1), the autonomous vehicle 100 may determine a cut-out situation where the target vehicle cuts out suddenly or sharply from the current lane to a neighboring lane, under the control of the processor 130.

In step 133*c*, if the cut-out situation is determined, the autonomous vehicle 100 may set a second movement index (Movement Index 2) to "1 (Index B=1)," under the control of the processor 130.

As described above, if values of lateral velocity components (e.g., the lateral velocity and the lateral acceleration) of the target vehicle, in the collected driving information of the target vehicle, are above a certain level, the autonomous driving vehicle 100 may determine that the target vehicle is in the cut-out situation where the target vehicle cuts out suddenly or sharply from the current lane to a neighboring lane, under the control of the processor 130.

Figure 5:
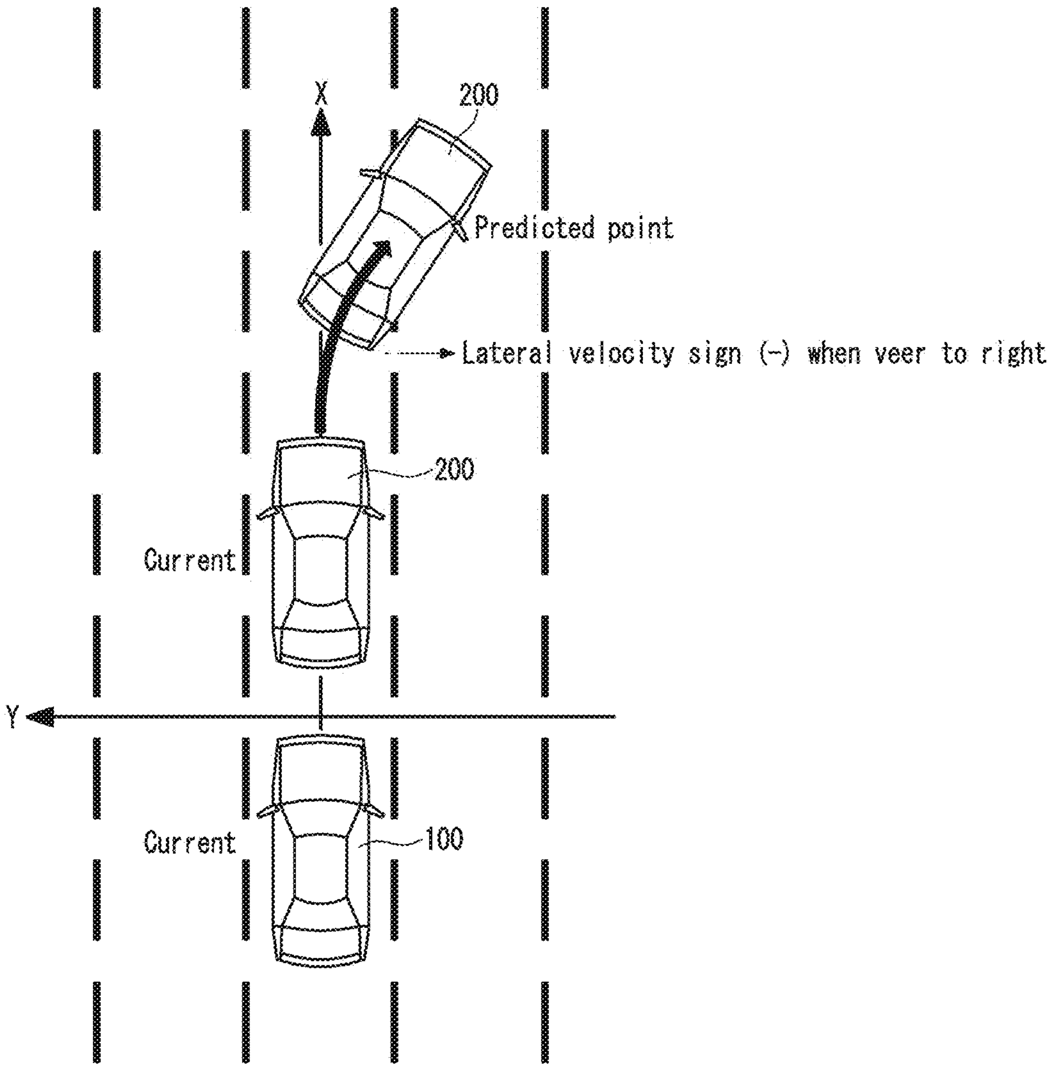
FIG. 5 and FIG. 6 are diagrams illustrating a method of calculating a motion index based on lateral information of a target vehicle.
Figure 6:
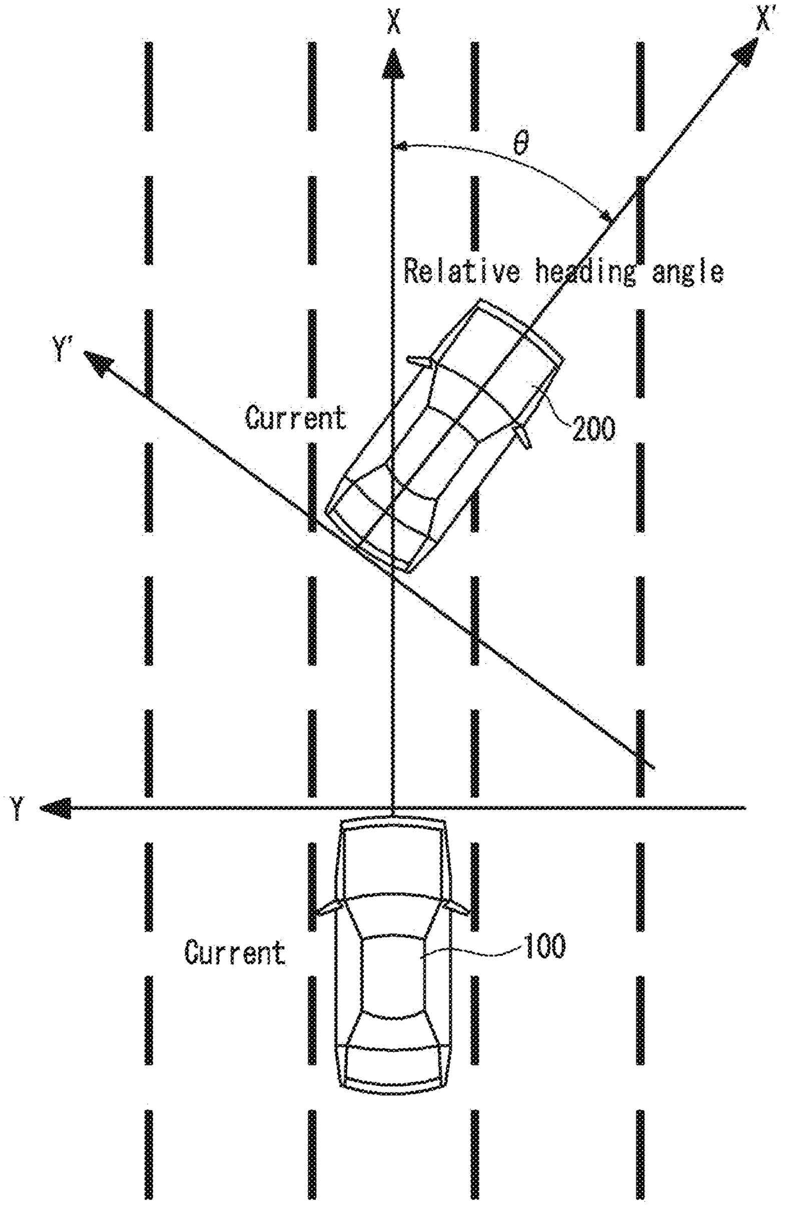

FIGS. 5 and 6 are diagrams illustrating a method of calculating a motion index based on lateral information of a target vehicle.

Referring to FIGS. 5 and 6, a method of calculating a motion index.

For example, using collected driving information including lateral position information, lateral velocity information, and relative heading angle information of a target vehicle 200, the autonomous vehicle 100 may determine a future direction of motion of the target vehicle 200 and, if the target vehicle 200 is predicted to change a lane, may determine a cut-out, under the control of the processor 130.

For example, under the control of the processor 130, the autonomous vehicle 100 may analyze current lateral position information of the target vehicle 200, and may set a sign of a lateral position to plus (+) if the target vehicle 200 is positioned to the left relative to the ego vehicle 100 and set the sign of the lateral position to minus (−) if the target vehicle 200 is positioned to the right relative to the ego vehicle 100.

In addition, under the control of the processor 130, the autonomous vehicle 100 may analyze current lateral velocity information of the target vehicle 200, and may set a sign of a lateral velocity to plus (+) if the target vehicle 200 is traveling in a left direction relative to the ego vehicle 100 and set the sign of the lateral velocity to minus (−) if the target vehicle 200 is traveling in a right direction relative to the ego vehicle 100.

Further, under the control of the processor 130, the autonomous vehicle 100 may analyze relative heading angle information of the target vehicle 200. The relative heading angle information of the target vehicle 200 may be about a relative heading angle between the ego vehicle 100 and the target vehicle 200.

For example, under the control of the processor 130, the autonomous vehicle 100 may analyze the relative heading angle information of the target vehicle 200, and may set a sign of the heading angle to plus (+) if the relative heading angle of the target vehicle 200 is in a left direction relative to the ego vehicle 100 and set the sign of the heading angle to minus (−) if the relative heading angle of the target vehicle 200 is in a right direction relative to the ego vehicle 100.

As shown in FIG. 5, the autonomous vehicle 100 may set a first motion index C1 using the set lateral direction information of the target vehicle 200 and the set lateral velocity information of the target vehicle 200, under the control of the processor 130.

For example, under the control of the processor 130, if the target vehicle 200 is determined, based on the set lateral direction information of the target vehicle 200 and the set lateral velocity information of the target vehicle 200, to be moving in a direction receding from the center of the ego vehicle 100, the autonomous vehicle 100 may set a sign of the first motion index C1 to plus (+).

In contrast, under the control of the processor 130, if the target vehicle 200 is determined, based on the set lateral direction information of the target vehicle 200 and the set lateral velocity information of the target vehicle 200, to be moving in a direction closer to the center of the ego vehicle 100, the autonomous vehicle 100 may set the sign of the first motion index C1 to minus (−).

Also, as shown in FIG. 6, the autonomous vehicle 100 may set a second motion index C2 using the set lateral direction information of the target vehicle 200 and the set relative heading angle information of the target vehicle 200, under the control of the processor 130.

For example, under the control of the processor 130, if it is determined that the target vehicle 200 veers further to the left than the ego vehicle 100 using the set lateral direction information of the target vehicle 200 and the relative heading angle information of the target vehicle 200, the autonomous vehicle 100 may set a sign of the second motion index C2 to plus (+).

In contrast, under the control of the processor 130, if it is determined that the target vehicle 200 veers further to the right than the ego vehicle 100 using the set lateral direction information of the target vehicle 200 and the relative heading angle information of the target vehicle 200, the autonomous vehicle 100 may set the sign of the second motion index C2 to minus (−).

If the first motion index and the second motion index are set as described above, the autonomous vehicle 100 may set a motion index using the set first motion index and the set second motion index, under the control of the processor 130.

For example, under the control of the processor 130, in a case where the target vehicle 200 changes a lane from its current lane to the right, as a lateral direction position of the target vehicle 200 is moved to the right, the autonomous vehicle 100 may determine a sign of the lateral direction position of the target vehicle 200 to be minus (−) and a sign of the relative heading angle to be minus (−). Accordingly, a sign of a product of the two values may be plus (+).

Also, under the control of the processor 130, in a case where the target vehicle 200 changes a lane from its current lane to the left, as the lateral direction position of the target vehicle 200 is moved to the left, the autonomous vehicle 100 may determine the sign of the lateral direction position of the target vehicle 200 to be plus (+) and the sign of the relative heading angle of the target vehicle 200 to be plus (+). Accordingly, a sign of a product of the two values may be plus (+).

That is, if the target vehicle 200 is moving in the direction receding from the center of the ego vehicle 100, the product of the lateral position of the target vehicle 200 and the relative heading angle value of the target vehicle 200 may be a positive number.

If the product of the set first motion index and the second motion index is positive or plus (+) as described above, the autonomous vehicle 100 may determine a cut-out situation, and set the motion index to "1 (Index C=1)," under the control of the processor 130.

Figure 7:
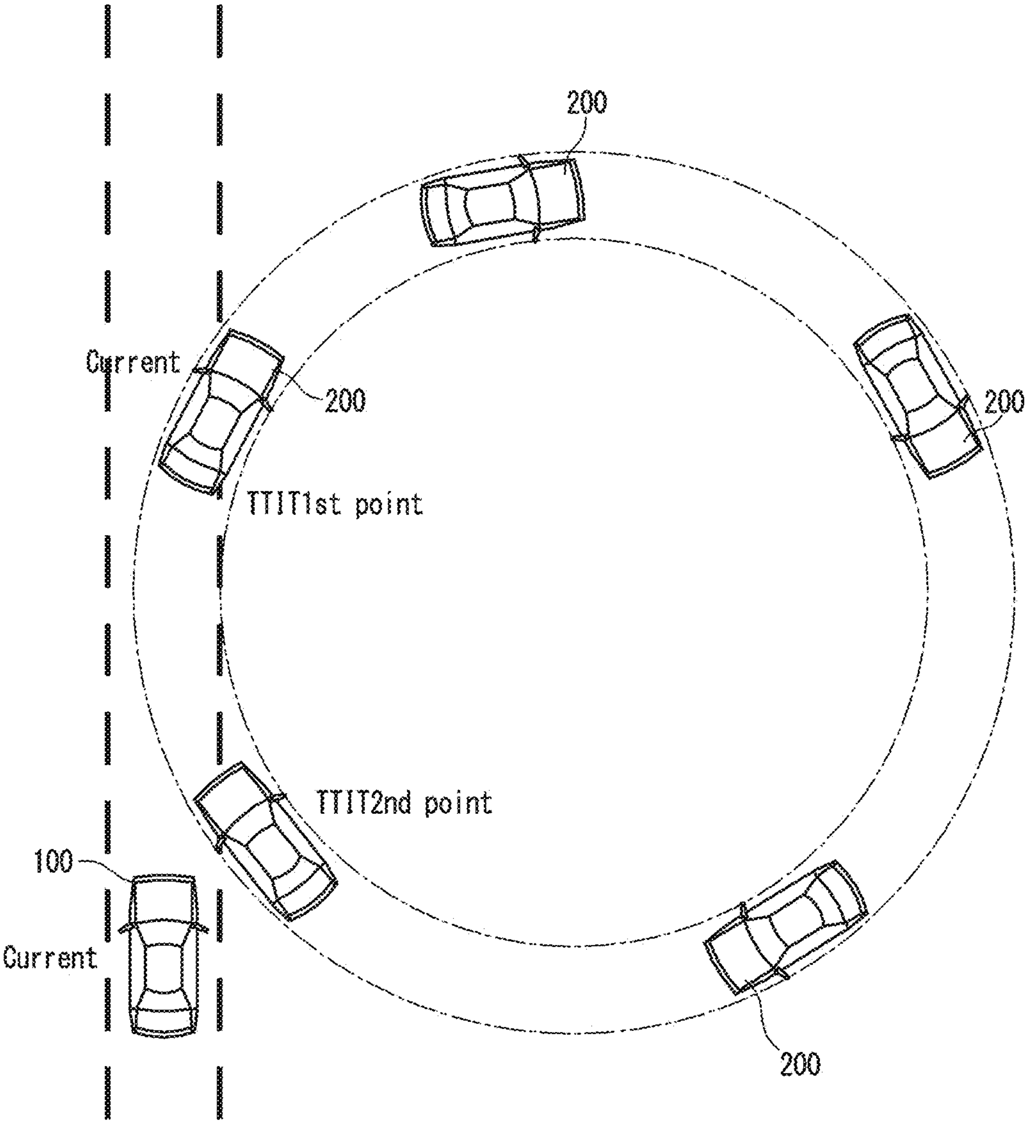
FIG. 7 is a diagram illustrating a method of calculating a collision index based on a path of a target vehicle and a path of an (ego) vehicle.

FIG. 7 is a diagram illustrating a method of calculating a collision index based on a path of a target vehicle and a path of an ego vehicle.

Referring to FIG. 7, a method of calculating a collision index.

The autonomous vehicle 100 may analyze a path of a target vehicle 200 and a path of the ego vehicle 100 in collected driving information and, if these paths are predicted to overlap based on a result of the analysis, the autonomous vehicle 100 may determine a value that is less than or equal to a preset threshold value and may determine a collision, under the control of the processor 130.

A time to intersect target (TTIT) may be defined as a time that is used for the path of the ego vehicle 100 and the path of the target vehicle 200 to intersect each other. For example, a first TTIT (TTIT1st) may be a first time point at which the target vehicle 200 enters the path of the ego vehicle 100, an a second TTIT (TTIT2nd) may be a second time point at which the target vehicle 200 enters the path of the ego vehicle 100.

As shown in FIG. 7, TTIT1st is if the target vehicle 200 is cutting out within a current lane, and the autonomous vehicle 100 may set TTIT1st to "0" because the target vehicle 200 is initially present on the current path, under the control of the processor 130.

In contrast, TTIT2nd is if the target vehicle 200 is cutting out within the current lane and meets, the second time, the current path on the path of the target vehicle, and the autonomous vehicle 100 may set TTIT2nd as "d," under the control of the processor 130.

If, of the set TTIT1st and the set TTIT2n, the calculated TTIT2n "d" is less than or equal to a preset threshold value (Tth), the autonomous vehicle 100 may determine a risk of a collision, under the control of the processor 130.

If the case where the calculated TTIT2nd "d" is less than or equal to the preset threshold value Tth is determined to be such a collision risk as described above, the autonomous vehicle 100 may set a collision index to "1 (Index D=1)," under the control of the processor 130.

Figures 8A, 8B:
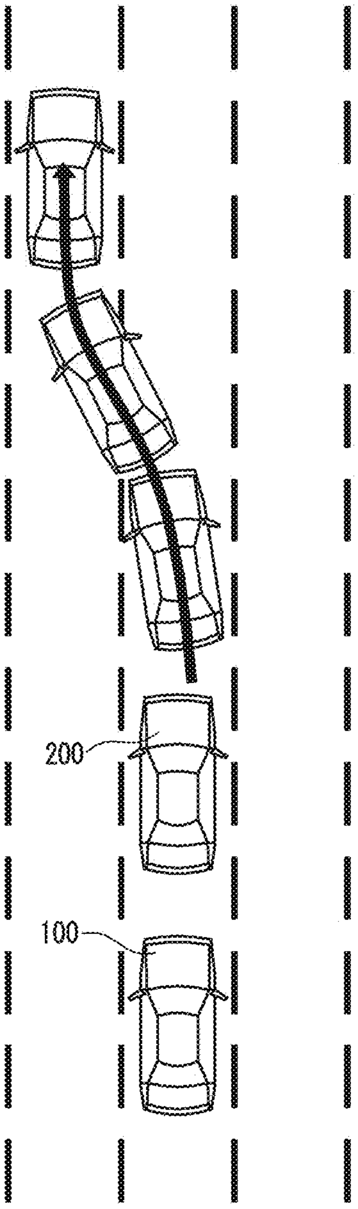
FIG. 8A and FIG. 8B are a diagram illustrating an example of operating in a first safety control mode.

FIG. 8A and FIG. 8B are a diagram illustrating an example of operating in a first safety control mode.

Referring to FIG. 8A and FIG. 8B, the autonomous vehicle 100 may determine whether cut-out condition is satisfied using a first movement index (A), a second movement index (B1, B2), a motion index (C1, C2), and a collision index (D), under the control of the processor 130.

For example, as shown in FIG. 8A and FIG. 8B, the autonomous vehicle 100 may determine that the cut-out condition is satisfied if the first movement index (A), the second movement index (B1, B2), the motion index (C1, C2), and the collision index (D) are each set to 1, and may set a second safety control mode that advances a brake control time, which is a control time of a driving safety function, in preparation for a sudden cut-out situation of a target vehicle 200, under the control of the processor 130.

Accordingly, the autonomous vehicle 100 may proactively prepare for similar situations or contingencies that may occur after the cut-out of the target vehicle 200.

Figures 9A, 9B:
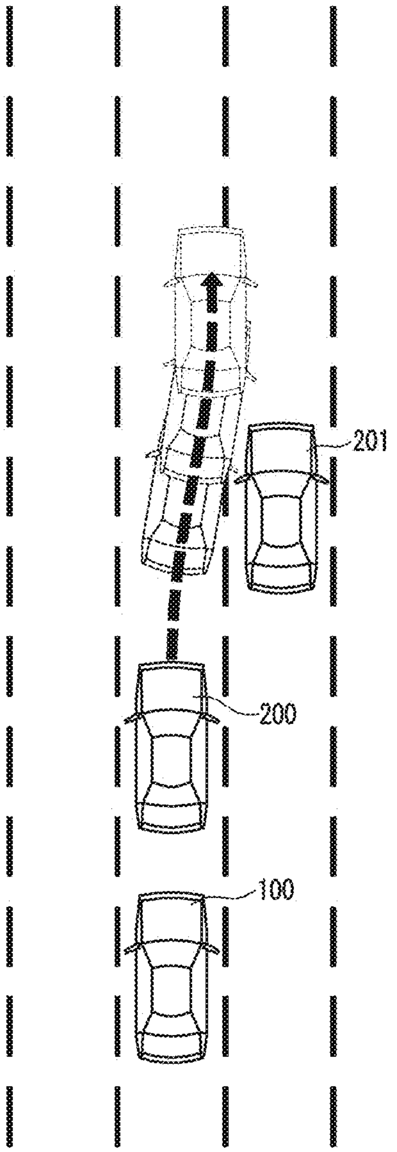
FIG. 9A and FIG. 9B are a diagram illustrating an example of operating in a second safety control mode.

FIG. 9A and FIG. 9B are a diagram illustrating an example of operating in a second safety control mode.

Referring to FIG. 9A and FIG. 9B, the autonomous vehicle 100 may determine whether a cut-out condition is satisfied using a first movement index (A), a second movement index (B1, B2), a motion index (C1, C2), and a collision index (D), under the control of the processor 130.

For example, as shown in FIG. 9A and FIG. 9B, the autonomous vehicle 100 may determine that the cut-out condition is not satisfied if at least one of the first movement index (A), the second movement index (B1, B2), the motion index (C1, C2), and the collision index (D) is set to 0 instead of 1, and may maintain a first safety control mode which operates based on a preset control point of a driving safety function, under the control of the processor 130.

As shown in FIG. 9B, as a target vehicle 200 moves to the right for a short period of time and then moves straight in a biased driving state, rather than a lateral position of the target vehicle 200 continues to move to the right, the autonomous vehicle 100 may determine that a first movement index (A), which determines whether the target vehicle 200 continues to recede from the center of the ego vehicle 100, does not satisfy the condition, and may not determine a cut-out of the target vehicle 200, under the control of the processor 130.

In this case, the autonomous vehicle 100 may operate in a first safety control mode based on an existing control time of a driving safety function or a preset control time of the driving safety function, under the control of the processor 130.

Figure 10A:
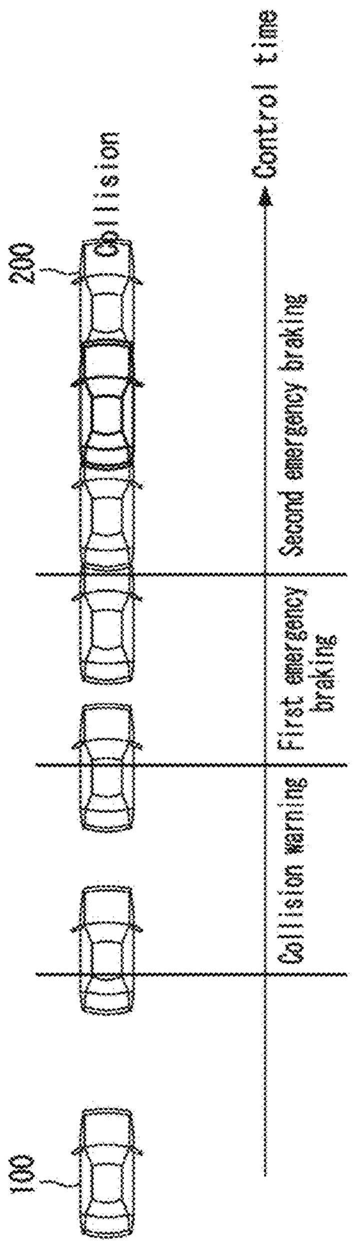
FIG. 10A and FIG. 10B are a diagram illustrating an autonomous vehicle operating in a second safety control mode.
Figure 10B:
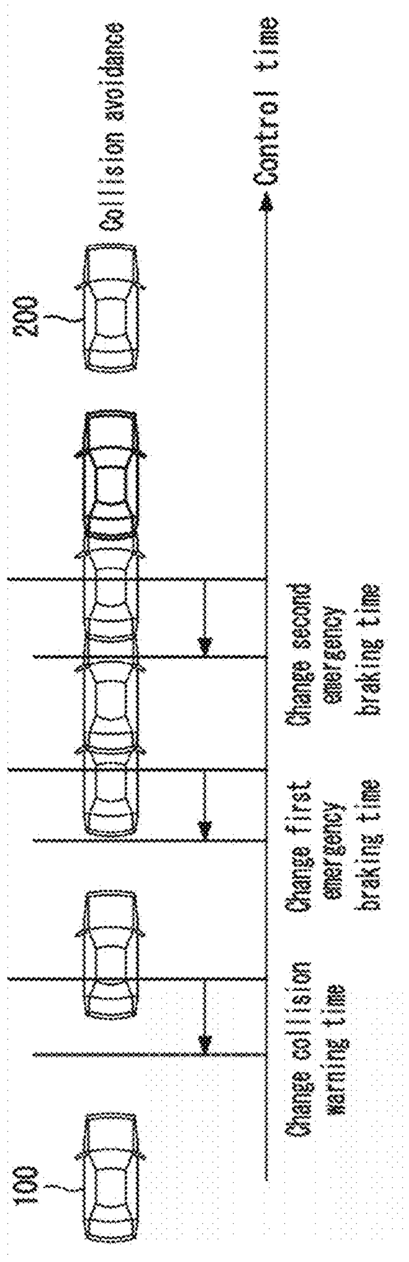

FIG. 10A and FIG. 10B are a diagram illustrating the autonomous vehicle 100 operating in a second safety control mode.

Referring to FIG. 10A and FIG. 10B, the autonomous vehicle 100 may be controlled to operate in a first safety control mode or a second safety control mode in response to a determination result, under the control of the processor 130.

For example, referring to FIG. 10A, if the autonomous vehicle 100 maintains the first safety control mode even if a cut-out condition is satisfied, the autonomous vehicle 100 may determine a collision risk level after recognizing a control target that is newly recognized after a cut-out of a target vehicle 200, and may thus recognize belatedly the suddenly recognized control target or determine belatedly a collision probability from a suddenly appearing obstacle, under the control of the processor 130.

As such, the autonomous vehicle 100 may collide with the belatedly recognized control target because a control time (or timing) is determined belatedly under the control of the processor 130, and thus control may not be performed at an appropriate time sufficient to avoid the collision.

In contrast, referring to FIG. 10B, if the cut-out condition is satisfied, the autonomous vehicle 100 may change the control mode to the second safety control mode that advances a brake control time, which is a control time of a driving safety function, in preparation for a sudden cut-out of the target vehicle 200, under the control of the processor 130.

In this case, the brake control time may change, simultaneously or sequentially, a collision warning time point, a first emergency braking time point, and a second emergency braking time point, based on a distance between the ego vehicle 100 and a control target newly recognized after the sudden cut-out of the target vehicle 200. However, examples are not limited thereto.

As described herein, under the control of the processor 130, the autonomous vehicle 100 may determine a sudden cut-out behavior of the target vehicle 200 using information such as the lateral position, lateral velocity, lateral acceleration, relative heading angle, and the like of the target vehicle 200 and, based on this, may advance a warning/control time (timing) of a driving safety function of the autonomous vehicle 100 in preparation for a potential occurrence of an accident situation, pedestrian or animal appearance, or similar situations in front of the target vehicle 200 to prepare for such a sudden collision risk.

Further, under the control of the processor 130, the autonomous driving vehicle 100 may determine a cut-out situation based on a plurality of elements such as a first movement index (A), a second movement index (B1, B2), a motion index (C1, C2), and a collision index (D), using physical quantity information related to the behavior of the target vehicle 200, and may double-check this to provide a robust and commercial driving safety technique.

Furthermore, under the control of the processor 130, the autonomous vehicle 100 may analyze the behavior of a preceding vehicle using sensors such as a front camera, a front radar, and a front-side lidar, and may determine that an unexpected situation such as an accident has occurred in front of the preceding vehicle if the preceding vehicle is likely to suddenly change from a current lane on which the preceding vehicle is currently traveling to a neighboring lane, based on a result of the analysis. Accordingly, under the control of the processor 130, the autonomous vehicle 100 may vary a brake control time for driving safety to prepare for a contingency, thereby improving the stability of driving.

The one or more example embodiments of the present disclosure described herein may be implemented as computer-readable code on a medium in which a program is recorded. The computer-readable medium may include all types of recording devices that store data to be read by a computer system. The computer-readable medium may include, for example, a hard disk drive (HDD), a solid-state drive (SSD), a silicon disk drive (SDD), a read-only memory (ROM), a random-access memory (RAM), a compact disc ROM (CD-ROM), a magnetic tape, a floppy disk, an optical data storage device, and the like.

A vehicle may include a memory configured to store computer instructions, and a processor configured to execute the computer instructions, wherein the processor, by executing the computer instructions, is configured to sense, using a plurality of sensors disposed at the vehicle, a preceding vehicle traveling before the vehicle, set the preceding vehicle as a target vehicle based on at least one sensor information obtained by the sensing, collect driving information of the target vehicle; determine whether the preceding vehicle is likely to cut out of a lane based on the collected driving information and a preset cut-out condition, and control the vehicle to operate in a first safety control mode or a second safety control mode in response to a result of the determining.

The driving information may include lateral position information of the target vehicle, lateral velocity information of the target vehicle, lateral direction information of the target vehicle, and information about a path of the target vehicle and a path of the vehicle.

The processor may be configured to determine, from the driving information, a first movement index based on the lateral position information of the target vehicle, a second movement index based on the lateral velocity information of the target vehicle, a motion index based on the lateral direction information of the target vehicle, and a collision index based on the path of the target vehicle and the path of the vehicle.

The processor may be configured to when the first movement index, the second movement index, the motion index, and the collision index all satisfy the preset cut-out condition, control the vehicle in the second safety control mode.

The processor may be configured to when at least one of the first movement index, the second movement index, the motion index, or the collision index does not satisfy the preset cut-out condition, control the vehicle in the first safety control mode.

The processor may be configured to set a brake control time in the second safety control mode to be different from a brake control time in the first safety control mode.

The processor may be configured to change the brake control time in the second safety control mode to be shorter than the brake control time in the first safety control mode.

The brake control time in the second safety control mode may include a collision warning time point, a first emergency braking time point, and a second emergency braking time point, and the processor may be configured to change, sequentially or simultaneously, the collision warning time point, the first emergency braking time point, and the second emergency braking time point, based on a distance of the target vehicle from a control target sensed after the target vehicle cuts out of the lane.

The processor may be configured to when the preceding vehicle is traveling in a same lane as the vehicle, set the preceding vehicle as the target vehicle.

A method of controlling a vehicle may include sensing, by a processor executing computer instructions stored in a memory, a preceding vehicle traveling before the vehicle using a plurality of sensors disposed at the vehicle, setting the preceding vehicle as a target vehicle based on at least one sensor information obtained by the sensing, collecting driving information of the target vehicle; determining whether the preceding vehicle is likely to cut out of a lane based on the collected driving information and a preset cut-out condition, and controlling the vehicle to operate in a first safety control mode or a second safety control mode in response to a result of the determining.

The autonomous vehicle and the control method configured as described herein may, under the control of a processor, analyze the behavior of a preceding vehicle using sensors and, when it is analyzed that the preceding vehicle is likely to suddenly change from a current lane on which it is currently traveling to a neighboring lane; determine a high probability of an unexpected situation such as an accident in front of the preceding vehicle; and vary a brake control time for driving safety to prepare for a contingency.

Further, the autonomous vehicle and the control method configured as described herein may, under the control of the processor, predict an unexpected situation or a dangerous situation in front of a preceding vehicle; and vary a brake control time for driving safety based on a result of the prediction to improve the driving stability of the autonomous vehicle.

Further, the autonomous vehicle and the control method configured as described herein may, under the control of the processor, predict an unexpected situation or a dangerous situation in front of a preceding vehicle traveling before the autonomous vehicle; and vary a brake control time for driving safety based on a result of the prediction to improve the reliability of the autonomous vehicle.

Accordingly, the preceding detailed description should not be construed as restrictive but as illustrative in all respects. The scope of the embodiments of the present disclosure should be determined by reasonable interpretation of the appended claims, and all changes and modifications within the equivalent scope of the present disclosure are included in the scope of the present disclosure.

What is claimed is:

1. A vehicle comprising:

one or more sensors configured to detect at least one vehicle;

memory configured to store computer-readable instructions; and a processor configured to execute the computer-readable instructions, wherein the processor, by executing the computer-readable instructions, is configured to:

set a lead vehicle, of the at least one vehicle, as a target vehicle, wherein the lead vehicle is traveling ahead of the vehicle;

receive, via the one or more sensors, behavior information associated with the target vehicle;

determine, based on the behavior information associated with the target vehicle, a plurality of indices of the target vehicle;

determine whether each of the plurality of indices of the target vehicle satisfies a predetermined cut-out condition, wherein the predetermined cut-out condition is associated with a likelihood of the target vehicle cutting out of a lane; and control, based on the plurality of indices of the target vehicle satisfying the predetermined cut-out condition, the vehicle to operate, among a first safety control mode and a second safety control mode of the vehicle, in a safer safety control mode of the first safety control mode and the second safety control mode.

2. The vehicle of claim 1, wherein the behavior information comprises at least one of:

a lateral position of the target vehicle, a lateral velocity of the target vehicle, a lateral direction of the target vehicle, a path of the target vehicle, or a path of the vehicle.

3. The vehicle of claim 2, wherein the plurality of indices of the target vehicle comprise:

a first movement index determined based on the lateral position of the target vehicle;

a second movement index determined based on the lateral velocity of the target vehicle;

a motion index determined based on the lateral direction of the target vehicle; and a collision index determined based on the path of the target vehicle and the path of the vehicle.

4. The vehicle of claim 3, wherein the second safety control mode requires a faster reaction of the vehicle than the first safety control mode, and wherein the processor is configured to control the vehicle to operate in the safer safety control mode by:

controlling the vehicle in the second safety control mode based on the first movement index, the second movement index, the motion index, and the collision index satisfying the predetermined cut-out condition.

5. The vehicle of claim 4, wherein a brake control time associated with the second safety control mode is different from a brake control time associated with the first safety control mode.

6. The vehicle of claim 4, wherein a brake control time associated with the second safety control mode is less than a brake control time associated with the first safety control mode.

7. The vehicle of claim 4, wherein a brake control time associated with the second safety control mode comprises:

a collision warning time, a first emergency braking time, and a second emergency braking time, and wherein the processor is further configured to:

change the collision warning time, the first emergency braking time, and the second emergency braking time, based on a distance between the target vehicle and a control target sensed after the target vehicle cuts out of the lane.

8. The vehicle of claim 3, wherein the second safety control mode requires a faster reaction of the vehicle than the first safety control mode, and wherein the processor is configured to control the vehicle to operate in the safer safety control mode by:

controlling the vehicle in the first safety control mode based on at least one of the first movement index, the second movement index, the motion index, or the collision index not satisfying the predetermined cut-out condition.

9. The vehicle of claim 1, wherein the processor is further configured to:

set, based on the lead vehicle and the vehicle traveling in the lane, the lead vehicle as the target vehicle.

10. A method performed by an apparatus of a vehicle, the method comprising:

detecting, via one or more sensors of the vehicle, at least one vehicle;

setting a lead vehicle, of the at least one vehicle, as a target vehicle, wherein the lead vehicle is traveling ahead of the vehicle;

receiving, via the one or more sensors, behavior information associated with the target vehicle;

determining, based on the behavior information associated with the target vehicle, a plurality of indices of the target vehicle;

determining whether each of the plurality of indices of the target vehicle satisfies a predetermined cut-out condition, wherein the predetermined cut-out condition is associated with a likelihood of the target vehicle cutting out of a lane; and controlling, based on the plurality of indices of the target vehicle satisfying the predetermined cut-out condition, the vehicle to operate, among a first safety control mode and a second safety control mode of the vehicle, in a safer safety control mode of the first safety control mode and the second safety control mode.

11. The method of claim 10, wherein the behavior information comprises at least one of:

a lateral position of the target vehicle, a lateral velocity of the target vehicle, a lateral direction of the target vehicle, a path of the target vehicle, or a path of the vehicle.

12. The method of claim 11, wherein the plurality of indices of the target vehicle comprise:

a first movement index determined based on the lateral position of the target vehicle;

a second movement index determined based on the lateral velocity of the target vehicle;

a motion index determined based on the lateral direction of the target vehicle; and a collision index determined based on the path of the target vehicle and the path of the vehicle.

13. The method of claim 12, wherein the second safety control mode requires a faster reaction of the vehicle than the first safety control mode, and wherein controlling the vehicle to operate in the safer safety control mode comprises:

controlling the vehicle in the second safety control mode based on the first movement index, the second movement index, the motion index, and the collision index satisfying the predetermined cut-out condition.

14. The method of claim 13, wherein a brake control time associated with the second safety control mode is different from a brake control time associated with the first safety control mode.

15. The method of claim 13, wherein a brake control time associated with the second safety control mode is less than a brake control time associated with the first safety control mode.

16. The method of claim 13, wherein a brake control time associated with the second safety control mode comprises:

a collision warning time, a first emergency braking time, and a second emergency braking time, and wherein the method further comprises:

changing the collision warning time, the first emergency braking time, and the second emergency braking time, based on a distance between the target vehicle and a control target sensed after the target vehicle cuts out of the lane.

17. The method of claim 12, wherein the second safety control mode requires a faster reaction of the vehicle than the first safety control mode, and wherein controlling the vehicle to operate in the safer safety control mode comprises:

controlling the vehicle in the first safety control mode based on at least one of the first movement index, the second movement index, the motion index, or the collision index not satisfying the predetermined cut-out condition.

18. The method of claim 10, further comprising:

setting, based on the lead vehicle and the vehicle traveling in the lane, the lead vehicle as the target vehicle.

19. An ego vehicle comprising:

a processor; and memory storing computer-readable instructions configured to be executed by the processor to cause the ego vehicle to:

determine, based on a lateral position of a target vehicle that is traveling ahead of the ego vehicle, a first movement index;

determine, based on a lateral velocity of the target vehicle, a second movement index;

determine, based on a lateral direction of the target vehicle, a motion index;

determine, based on a path of the target vehicle and a path of the ego vehicle, a collision index; and based on the first movement index, the second movement index, the motion index, and the collision index satisfying a predetermined cut-out condition associated with a likelihood of the target vehicle cutting out of a lane, control the ego vehicle to operate, among a first safety control mode and a second safety control mode of the ego vehicle, in the second safety control mode, wherein the second safety control mode requires a faster braking reaction time than the first safety control mode.

* * * * *